US007130545B2

United States Patent
Lou et al.

(10) Patent No.: US 7,130,545 B2
(45) Date of Patent: Oct. 31, 2006

(54) HIGH SPEED ELECTRO-OPTIC CLOCK RECOVERY CIRCUIT

(75) Inventors: Janet W. Lou, Alexandria, VA (US); Thomas F. Carruthers, Laurel, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 830 days.

(21) Appl. No.: 10/166,324

(22) Filed: Jun. 22, 2001

(65) Prior Publication Data

US 2003/0058503 A1     Mar. 27, 2003

(51) Int. Cl.
*H04B 10/00* (2006.01)
*H04B 10/04* (2006.01)
*H04B 10/12* (2006.01)

(52) U.S. Cl. ............... 398/198; 398/155; 398/163; 398/183

(58) Field of Classification Search ........... 398/155, 398/183, 163, 192, 198; 388/198
See application file for complete search history.

(56) References Cited

U.S. PATENT DOCUMENTS 5,513,030 A * 4/1996 Epworth .............. 398/198
5,999,292 A * 12/1999 Dennis et al. ........... 398/101
6,697,576 B1 * 2/2004 Rollins et al. .......... 398/159

OTHER PUBLICATIONS

Dennis T. K. Tong et al., Optoelectronic Phase-Locked Loop with Balanced Photodetection for Clock Recovery in High-Speed Optical Time-Division-Multiplexed Systems, IEEE Photonics Technology Letters, vol. 12, No, 8, Aug. 2000.*
Tong et al. (IEEE Photonics Technology Letters, vol. 12, No: 8, Aug. 2000).*
Thomas Carruthers and Janet Lou, High Speed Optical Time Division Multiplexed Line To Base Rate Clock Recovery With An Electro Optic Phase Locked Loop, IEEE, 2001, pp. 157-158.

(Continued)

Primary Examiner—M. R. Sedighian
(74) Attorney, Agent, or Firm—John J. Karasek; Suresh Koshy

(57) ABSTRACT

An electro-optic clock recovery circuit comprising an electro-optic modulator circuit operatively coupled to; a photodetector circuit; a buffer circuit operatively coupled to said photodetector circuit; a voltage controlled oscillator operatively coupled to said buffer circuit and to said electro-optic modulator circuit; wherein the electro-optic modulator circuit receives and modulates a multi-channel input data stream, the photodetector circuit responsive to the modulated input data stream drives the voltage controlled oscillator in a phase locked loop through the buffer circuit, and the modulator circuit is responsive to the voltage controlled oscillator and is driven at a harmonic of the voltage controlled oscillator. A method for the recovery of a single channel clock rate from a optical time division multiplexed data stream whose data rate is a multiple of the base rate comprising the steps of: modulating a multi-channel data stream with an electro-optic modulator circuit, detecting the modulated data steam with a photodetector circuit, controlling the frequency of a voltage controlled oscillator with the voltage associated with the photodetector circuit; driving the electro-optic modulator circuit with the output of the voltage controlled oscillator wherein the transmission window of the electro-optic modulator is toggled at a harmonic of the frequency of said voltage controlled oscillator.

7 Claims, 7 Drawing Sheets

OTHER PUBLICATIONS

Thomas Carruthers and Janet Lou, 80- to 10-Gb/s Clock Recovery Using An Electro-Optic Phase Locked Loop, Proc. 27th Eur. Conf. on Opt. Comm., 2001, pp. 284-285.

Dennis T.K. Tong, Benny Mikkelsen, Greg Raybon, Torben Nielsen, Kevin Dreyer and John Johnson, Optoelectronic Phase Locked Loop With Balanced Photodetection For Clock Recovery In High Speed Optical Time division Multiplexed Systems, IEEE Photonics Technology Letters, vol. 12, No. 8, Aug. 2000, pp. 1064-1066.

Weiming Mao, Yuhua Li, Mohammed Al-Mumin and Guifang Li, All Optical Clock Recovery For Both RZ And NRZ Data, IEEE Photonics Technology Letters, vol. 14 No. 6, Jun. 2002, pp. 573-575.

T. Yamamoto, L.K. Oxenlowe, C. Schmidt, C. Schubert, E. Hilliger, U. Feiste, R. Ludwig and H.G. Weber, Clock Recovery From 160 Gbit/s Data Signals Using Phase Locked Loop With Interferometric Optical Switch Based On Semiconductor Optical Amplifier, Electronic Letters, vol. 37, No. 8, Apr. 12, 2001, pp. 509-510.

K. Murata, K. Sano, T. Akeyoshi, N. Shimizu, E. Sano M. Yamamoto and T. Ishibashi, Optoelectronic Clock Recovery Circuit Using Resonant tunneling Diode And Uni-Traveling Carrier Photodiode, Electronics Letters, vol. 34, No. 14, Jul. 9, 1998, pp. 1424-1425.

J.D. Phillips, A.D. Ellis, T. Widdowson, D. Nesset, A.E. Kelly and D. Trommer, 100 Gbit/s optical Clock Recovery Using Electrical Phaselocked Loop Consisting Of Commercially Available Components, Electronics Letters, vol. 36, No. 7, Mar. 30, 2000, pp. 650-652.

Walter Kaechele, Micael Dennis, R. Brian Jenkins, Thomas Carruthers and Irl N. Duling III, Dispersion-Managed transmission Of 100 Gb/s Time-Division-Multiplexed Return-To-Zero Format Data, Advanced Lightwave Applications Section, TuP3-1-TuP3-3, pp. 232-234.

Osamu Kamatani and Satoki Kawanishi, Ultrahigh Speed Clock Recovery With phase Lock Loop Based On Four-Wave Mixing In A Traveling-Wave Laser Diode Amplifier, Journal Of Lightwave Technology, vol. 14, No. 8, Aug. 1996, pp. 1757-1767.

B. Sartorius, C. Bornholdt, O. Brox, H.J. Ehrke, D. Hoffman, R. Ludwig and M. Mohrle, All Optical Clock Recovery Module Based On Self Pulsating DFB Laser, Electronics Letters, vol. 34, No. 17, Aug. 20, 1998, pp. 1664-1665.

C. Bornholdt, B. Sartorius, S. Schelhase, M. Mohrle and S. Bauer, Self Pulsating DFB Laser For all Optical clock Recovery At 40 Gbit/s, Electronics Letters, vol. 36, No. 4, Feb. 17, 2000, pp. 327-328.

S. Bigo and E. Desurvire, 20 GHz All Optical Clock Recovery based on Fibre laser Mode Locking With Fibre Nonlinear Loop Mirror As Variable Intensity/Phase Modulator, Electronics Letters, vol. 31, No. 21, Oct. 12, 1995, pp. 1855-1857.

* cited by examiner

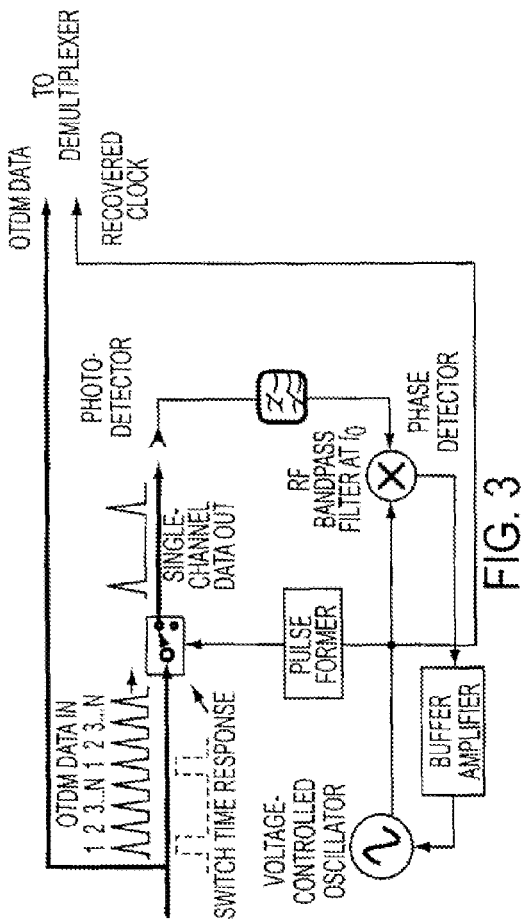
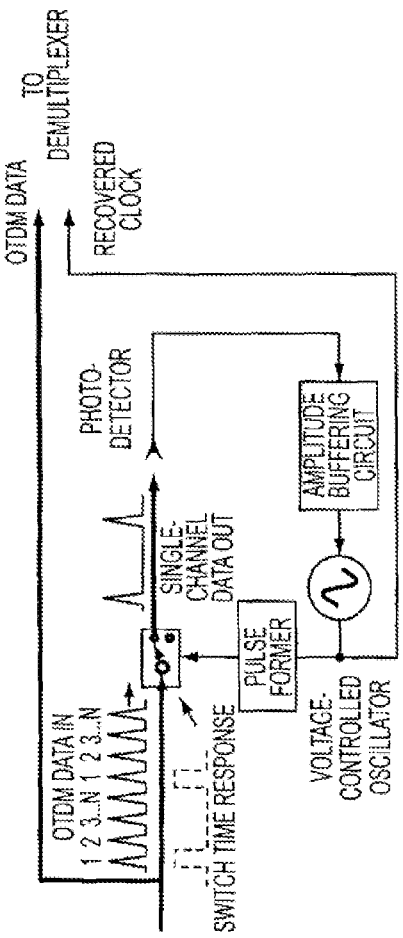
FIG. 3
FIG. 4

HIGH SPEED ELECTRO-OPTIC CLOCK RECOVERY CIRCUIT

BACKGROUND OF THE INVENTION

1. Field of the Invention

This invention relates generally to a device and method for clock recovery and specifically to a device and method for the recovery of a sub-harmonic clock rate from an optical pulse stream.

2. Description of the Prior Art

Optical fibers are often used to transmit binary data encoded upon a string of evenly-spaced optical pulses; this is generally known as a return-to-zero (RZ) format. The pulses are generated by an optical source typically producing at a rate of several gigahertz (GHz). The data is encoded upon them with an amplitude modulator, which allows a pulse to pass to express a binary "one" and which eliminates a pulse to express a "zero." RZ data therefore consists of a modulated pulse train.

The approximate maximum rate at which electronic data can be generated and converted to optical data is currently between 10 to 20 GHz. An optical fiber, however, is capable of carrying RZ data at much higher rates, if the duration of the optical pulses is sufficiently short. A common technique for increasing the data transmission capacity of a fiber transmission system, therefore, is to time interleave, or multiplex several optical data channels. This procedure is known as optical time division multiplexing (OTDM). The data transmission rate (line rate) of a fiber carrying N OTDM channels is then N times the rate of an individual channel. FIG. 1 illustrates an OTDM data transmitter. In FIG. 1 several individual channels (DATA 1–DATA N) having a common frequency are time interleaved and combined into a single data stream with multiple channels.

A problem at the receiving end is to de-interleave, or demultiplex, the individual constituent channels from the multi-channel data stream. This is a challenging problem because the line rate of the optical data stream may be too high for it to be divided down to the individual channel rate by electronic means.

One approach to the electronic switching speed limitation has been to use "all optical" clock recovery techniques. Generally, these techniques include nonlinear optical interactions in fiber loop mirrors, semiconductor optical amplifiers and self-pulsating diode lasers. These techniques, however, are susceptible to instabilities in the nonlinear media which leads to noisy or unreliable operation. They also require the added expense and complexity of a picosecond laser driven at the local recovered clock frequency.

Another approach has been to employ bootstrapped optical clock recovery and demultiplexing as shown in FIG. 2. In the bootstrapped system a single channel extracted from a demultiplexer is used to generate an error signal to trim the frequency of a local voltage-controlled oscillator. A demultiplexer operates by operating an optical switch at the single channel rate. The effective time window of the switch must be narrow enough to capture a single pulse. When the voltage-controlled oscillator's frequency is different from that of the data stream, a periodic signal will be detected by the photodetector whose frequency is the difference between the two frequencies. A phase detector is generally used to detect these differences. When the frequency difference is zero, the phase detector's output is a signal representing the phase difference between the two signals. This phase difference is used to ensure that the voltage-controlled oscillator's frequency and phase are maintained at the optimum values for extraction of the sampled channel.

Another approach has been to attempt single channel clock recovery using an ultra-fast electro-optic device as shown in FIG. 3. This approach uses a phase-locked loop (PLL) driving a voltage controlled oscillator in a manner similar to the bootstrapped approach, but employs a separate optical switch with monitors a single channel in the data stream to produce an error signal.

Yet another approach has been to employ an optical intensity-based feedback system as shown in FIG. 4. The circuit shown in FIG. 4 achieves single channel clock recovery by using an electro-optic modulator sampling the bit stream as a phase detector. Specifically, the phase difference between the optical switch and the data stream determines whether a pulse falls within the demultiplexer's time window. The average signal from a photodetector monitoring the switch will be zero if the pulses are outside the timing window and maximum if the pulses lie entirely within the window. The signal can be used as an error signal in a PLL to force the voltage-controlled oscillator driving the optical switch to operate at the proper frequency to extract the individual channels.

FIG. 5 shows yet another approach, which is a single-channel, intensity-based clock recovery circuit system employing an electro-absorption modulator (EAM) as reported by Tong et al.

The Tong device employs a balanced photodetector in an intensity-noise-cancelling system. The sampled current in the balanced photodetector system is the difference between the output of a photodetector monitoring the EAM and that of a photodetector monitoring an attenuated portion of the bit stream. The attenuator is adjusted so that the average current output is zero. Any noise due to optical intensity variations in the bit stream is of the same magnitude in both photodetectors and is cancelled out. The output of the balanced photodetector thus varies only due to variations in the phase between the bit stream and EAM's switching window.

SUMMARY OF THE INVENTION

An electro-optic clock recovery circuit comprising an electro-optic modulator circuit, a photodetector circuit operatively coupled to the modulator circuit, a buffer circuit, a voltage controlled oscillator. The voltage controlled oscillator is operatively coupled to the photodetector circuit through the buffer circuit. The electro-optic modulator circuit receives and samples the entire optical time division multiplexed data stream and is operatively coupled to the voltage controlled oscillator circuit in a phased lock loop.

An electro-optic clock recovery circuit comprising an electro-optic modulator circuit operatively coupled to a photodetector circuit, a buffer circuit is operatively coupled to the photodetector circuit. A voltage controlled oscillator is also operatively coupled to the buffer circuit and to an electro-optic modulator circuit. The electro-optic modulator circuit receives and modulates a multi-channel input data stream, while the photodetector circuit, responsive to the modulated input data stream, drives the voltage controlled oscillator in a phase locked loop through the buffer circuit. The modulator circuit is responsive to the voltage controlled oscillator and is driven at a harmonic of the voltage controlled oscillator. (VCO is locked to the base data rate)

A method for the recovery of a single channel clock rate from an optical time division multiplexed data stream whose data rate is a multiple of the base rate comprising the steps of: modulating a multi-channel data stream with an electro-optic modulator circuit, detecting the modulated data steam with a photodetector circuit, controlling the frequency of a voltage controlled oscillator with the voltage associated with the photodetector circuit; driving the electro-optic modulator circuit with the output of the voltage controlled oscillator wherein the transmission window of the electro-optic modulator is toggled at a harmonic of the frequency of said voltage controlled oscillator.

BRIEF DESCRIPTION OF THE DRAWINGS

FIG. 3 shows a single-channel based clock recovery circuit using a phase detector and a voltage-controlled oscillator.

FIG. 4 shows a single-channel based clock recovery circuit employing an optical-intensity-based feedback system.

DETAILED DESCRIPTION

Before the invention is explained in detail, a brief overview of the operation of the invention will now be provided to aid in the understanding of the invention.

The electro-optic clock recovery circuit features an electro-optic modulator circuit operatively coupled to a photodetector circuit, and a buffer circuit also operatively coupled to the photodetector circuit. A voltage controlled oscillator is operatively coupled to the buffer circuit and to the electro-optic modulator circuit.

The electro-optic modulator circuit receives and modulates an input data stream commonly called a bit stream. The photodetector circuit is responsive to the modulated input data stream and drives the voltage controlled oscillator in a phase locked loop through the buffer circuit. The modulator circuit, being responsive to RF signal received from the voltage controlled oscillator, is driven at a harmonic of the voltage controlled oscillator output frequency.

The electro-optic modulator circuit mixes the full bit data stream with a modified RF signal from voltage controlled oscillator to produce a signal representing the phase difference between the bit stream and the oscillator. This signal is detected with a low noise photodetector circuit and is used to bring the oscillator into synchronization with the optical bit stream. The output of the oscillator may be used to demultiplex or regenerate the bit stream. As described above, the disclosed clock recovery circuit uses an error signal to drive a voltage-controlled oscillator in a phased lock loop. The circuit generates an error signal which is derived from all the channels in the data stream, and its phase is therefore insensitive to variations in the optical power in individual channels. In a preferred embodiment, the circuit also uses a balanced photodetector system to eliminate errors due to optical intensity fluctuations in the data stream.

This circuit may also be used more generally to generate an rf signal whose frequency is a subharmonic of the bit rate of an optical pulse stream. In this context the clock-recovery circuit could be used in a photonic analog-to-digital conversion circuit, or to divide a single (not multi) high speed data channel into several lower speed subchannels.

Figure 1:
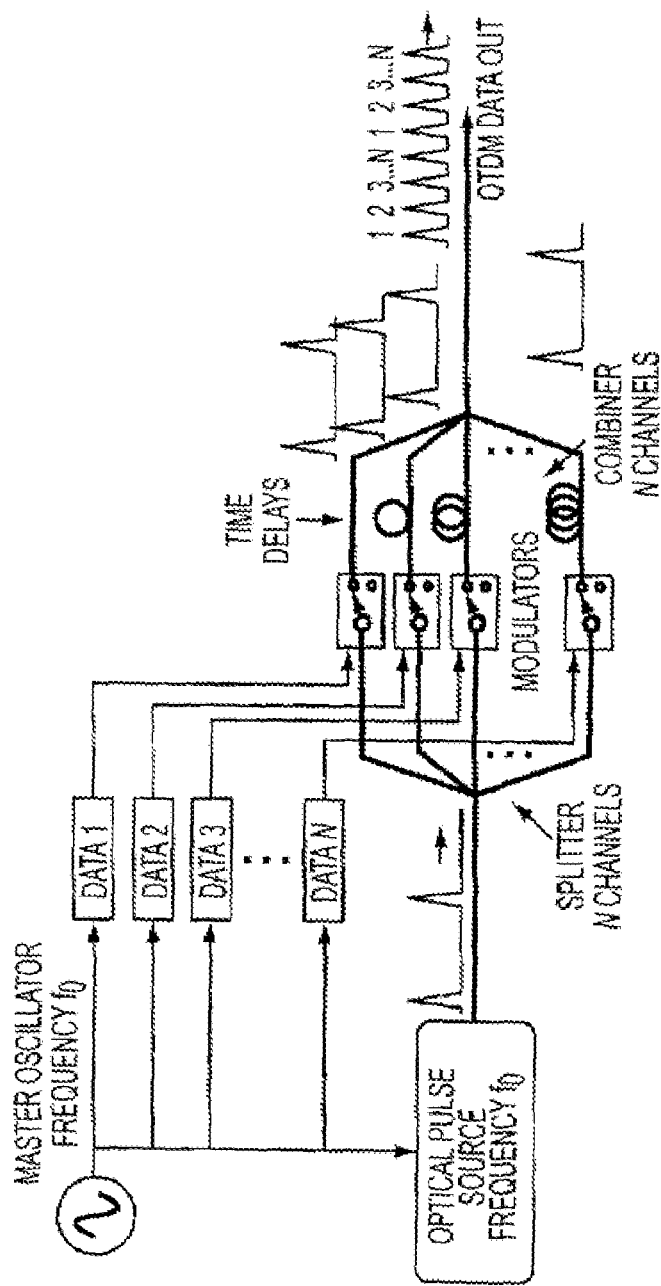
FIG. 1 shows an optical time-division multiplexed data transmitter.
Figure 2:
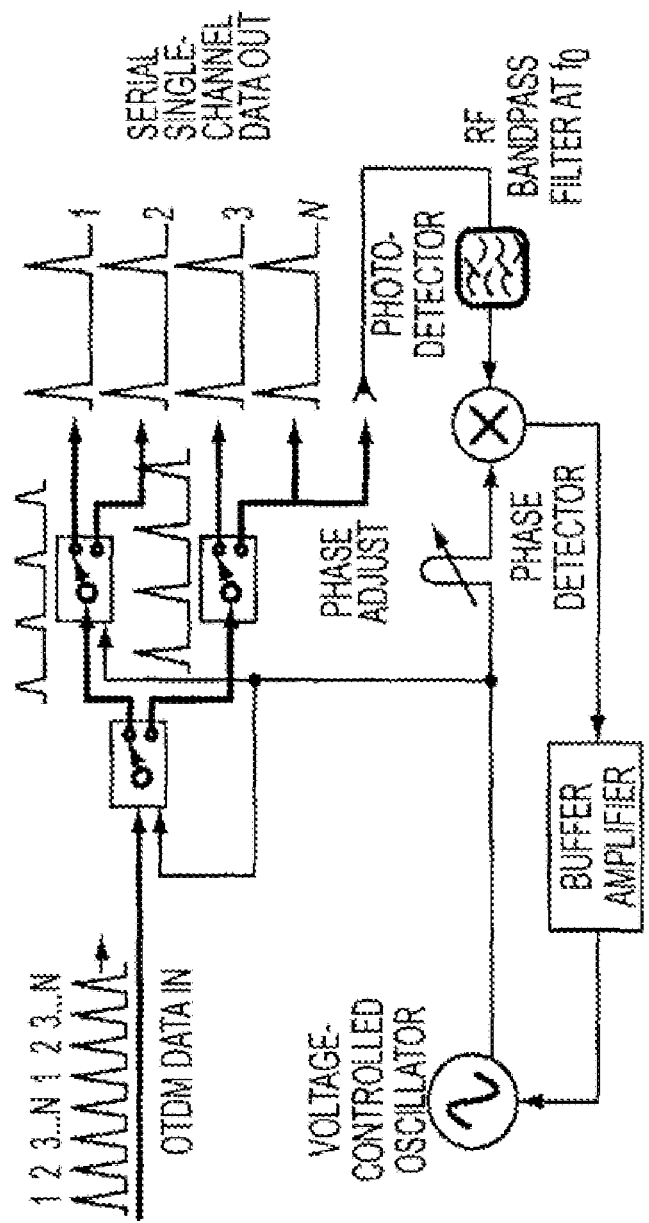
FIG. 2 shows an optical time-division multiplexed demultiplexer with a bootstrapped clock recovery system.
Figure 5:
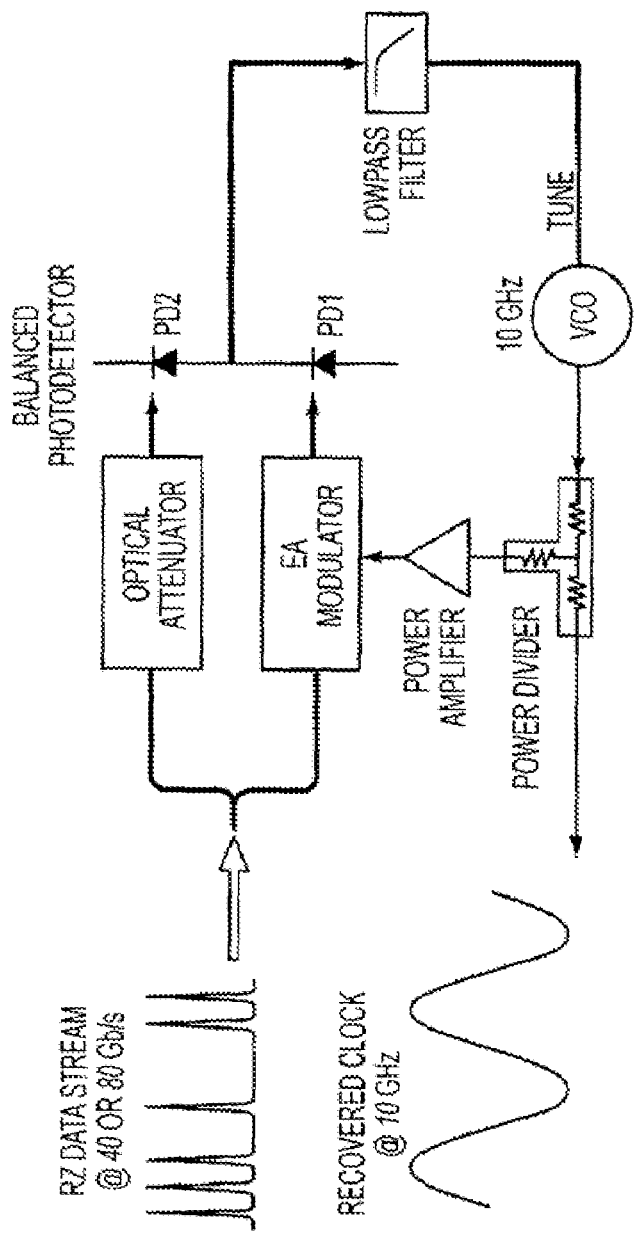
FIG. 5 shows a single-channel based clock recovery circuit employing an optical-intensity feedback system.
Figure 6:
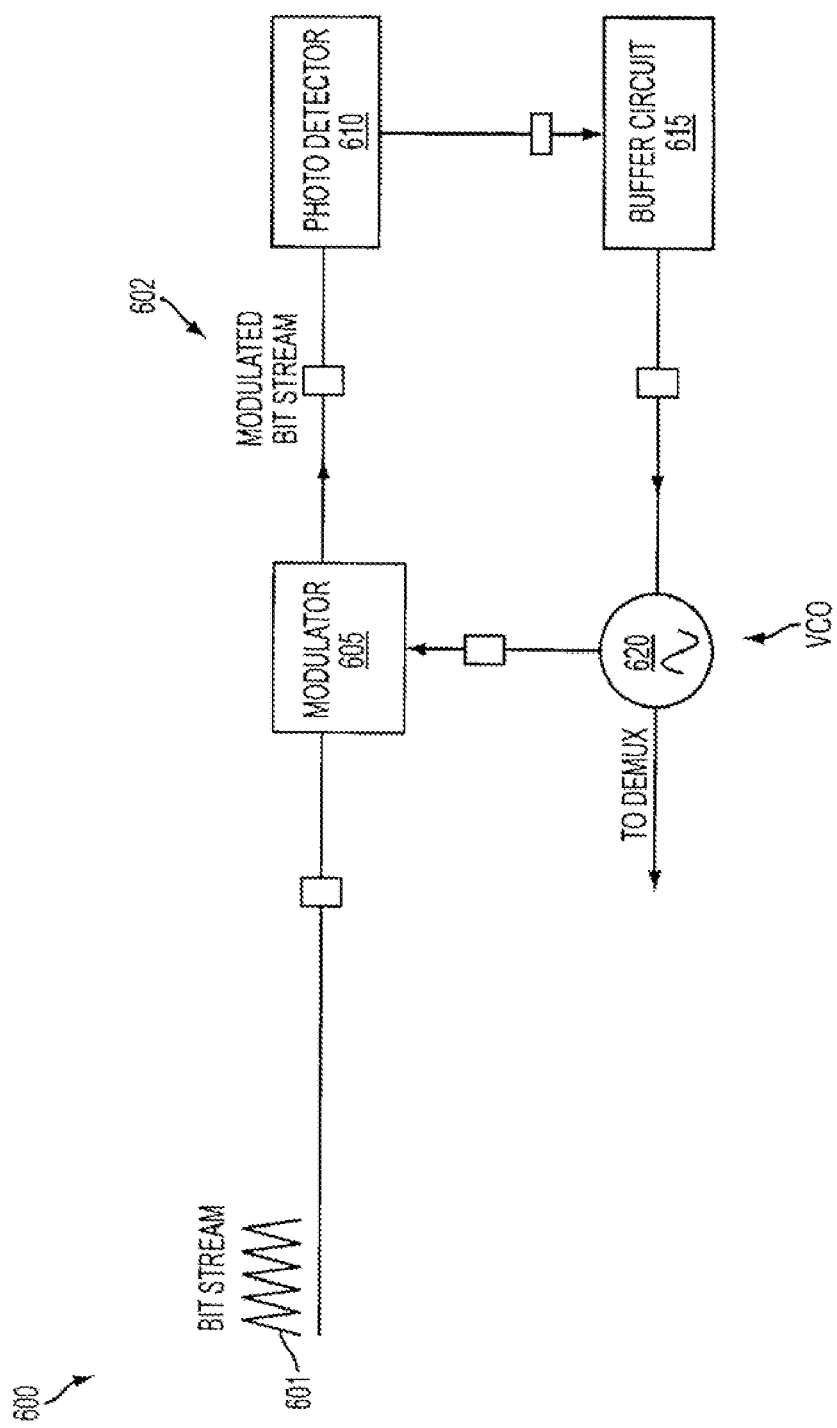
FIG. 6 shows a clock recovery circuit which employs all-channel sensitivity and balanced photodetection.

Referring to the figures wherein like reference numbers designate like elements, FIG. 6 shows an exemplary clock recovery circuit employing an electro-optic modulator circuit featuring all channel sensitivity and balanced photodetection. An electro-optic modulator is a device that uses an electro-optic material, such as $LiNbO_3$, that varies its optical index in response to an applied electric field.

The electro-optic clock recovery circuit 600 illustrated in FIG. 6 comprises an electro-optic modulator circuit 605, a photodetector circuit 610 operatively coupled to the electro-optic modulator circuit 605, a buffer circuit 615, a voltage controlled oscillator 620 operatively coupled to photodetector circuit 610 through buffer circuit 615, wherein the electro-optic modulator 605 circuit receives and samples the entire optical time division multiplexed data stream 601 and is operatively coupled to the voltage controlled oscillator circuit 620 in a phase-locked loop.

Electro-optic modulator circuit 605 receives and modulates a multi-channel input data stream 601. Photodetector circuit 610, responsive to the modulated input data stream 602 drives voltage controlled oscillator 620 in a phase locked loop through buffer circuit 615. Modulator circuit 605 is responsive to the voltage controlled oscillator 620 and is driven at a harmonic of the voltage controlled oscillator.

In operation, electro-optic modulator circuit 605 receives and modulates multi-channel data stream 601 to produce modulated bit stream 602. Photodetector circuit 610 operatively coupled to electro-optic modulator circuit 605, detects the modulated optical input data stream 602. Photodetector circuit, responsive to the modulated input data stream 602, generates a photodetector current reflective of the modulated input data stream 602. The photodetector current, is coupled into buffer circuit 615. Responsive to the photodetector current, buffer circuit 615 generates a voltage responsive to the photodetector current associated with photodetector circuit 610.

The output voltage from buffer circuit 615 is used to control the frequency of voltage controlled oscillator 620. Thus the buffer circuit 615 output voltage controls the frequency of the voltage controlled oscillator with the voltage associated with the photodetector circuit. The output of the voltage controlled oscillator is used to drive the electro-optic modulator circuit. The transmission window of the electro-optic modulator 605 is therefore toggled at a harmonic of the frequency of voltage controlled oscillator 620, locking the voltage controlled oscillator 620 to the base data rate of multi-channel input data stream 601.

Figure 7:
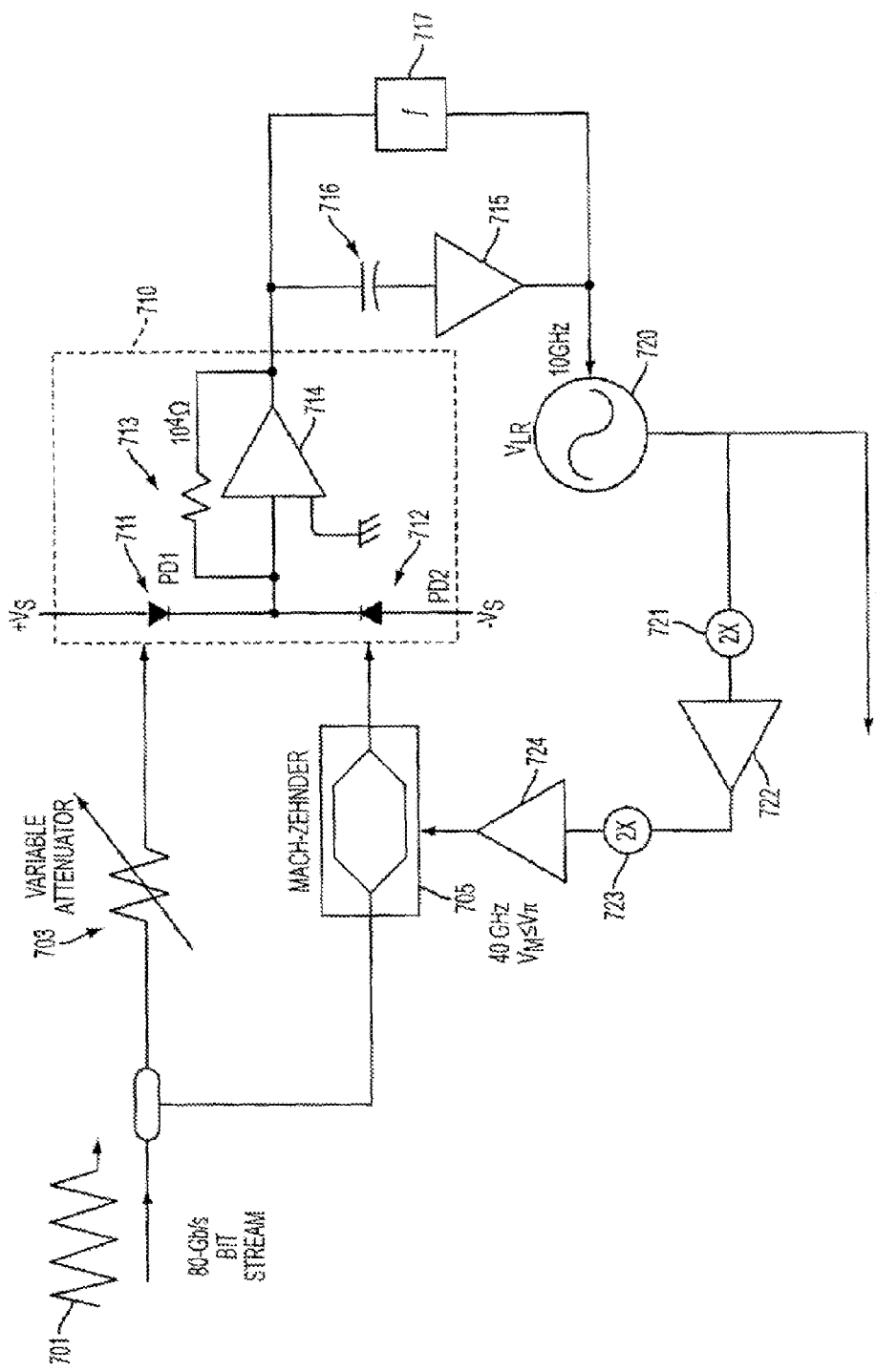
FIG. 7 shows a clock recovery circuit which employs all-channel sensitivity and balanced photodetection using a Mach-Zehnder modulator.

FIG. 7 illustrates another example embodiment. In this example embodiment the clock recovery circuit is employed to operate in a high speed data stream. Specifically the device in FIG. 7 functions in a high speed data stream with a line data rate—80 gigabits per second (Gb/s) allowing one to divide the line rate by a factor of 8 to provide a base rate clock frequency of 10 GHz.

With continued reference to the example embodiment of FIG. 7 this circuit employs a high speed Mach-Zehnder modulator 705 and variable attenuator 703 which are coupled to receive an 80-Gb/s bit stream 701 as input. Mach-Zehnder modulator 705 is further coupled to slow photodetector (PD2) 712 which is series connected to a second photodetector (PD1) 711. Second slow photodetector is also coupled to variable attenuator 703. Photodetector 712 and 713 are "slow photodetectors" meaning they have a frequency response bandwidth much less than the base data rate. Slow photodetector (PD1) 712 and second photodetector (PD2) 711 are further coupled to transimpediance amplifier 714 to form balanced photodetector circuit 710. Photodetector circuit 710 is coupled to buffer circuit employing an ac-coupled amplifier comprising amplifier 715 and capacitor 716 and a dc integrator circuit 717, which both drive the voltage controlled oscillator 720. The voltage controlled oscillator is coupled to the demultiplexer (not shown) and Mach Zehnder modulator 705 through two amplifiers 724, 722 and 2× frequency multipliers 721, 723.

In the embodiment shown in FIG. 7 the output of local 10-GHz voltage controlled oscillator 720 is multiplied to 40 GHz wherein the amplitude of $V_m \leq V_\pi$ by frequency multipliers 721, 723 and amplifiers 724, 725. The 40-GHz signal drives high speed Mach-Zehnder amplitude modulator 705. The Mach-Zehnder modulator 705 is dc-biased for minimum transmission, so that the transmission window of Mach-Zehnder modulator 705 is toggled at an 80-GHz rate. A portion of the 80-Gb/s data stream is directed through modulator 705 and is detected with photodetector (PD2) 712. The photocurrent produced by photodetector 712 is balanced by the current through a series connected photodetector (PD1) 711 which samples a portion of the entire 80-Gb/s bit stream. The optical intensity at photodetector 711 (PD1) is adjusted so that the average current to ground of the photoconductor pair is zero. This balanced photodetector circuit 710 eliminates low-frequency (up to the ~1-GHz bandwidth of the photodetector) intensity noise in the optical line signal. Transimpedance amplifier 715 and a dc integrator 717 (which ensures that the average error signal is zero) are then used to control the frequency of the VCO 720.

Photodetector (PD2) 712 responds to the average light intensity passed by Mach-Zehnder modulator 705. This intensity varies with the relative phase $\Phi$ between the optical bit stream 701 and the 40-GHz driving frequency. When $\Phi=0$, the maximum amount of light is transmitted. When $\Phi=\pm\pi/2$ no light is transmitted through the Mach-Zehnder modulator 705. No phase adjustments are necessary in the rf section of the control circuit, since the VCO selects the phase which will produce the preset balanced photocurrent.

The example embodiment shown in FIG. 7 contains a Mach-Zehnder modulator biased at minimum transmission. This feature allows the modulator to open and close even when the driving voltages are much less than the $V_\pi$ of the device. This allows the use of high-voltage microwave amplifiers to be avoided lowering the cost, at the expense of some sensitivity. This also allows the modulator to be driven at very high frequencies, in which case its $V_\pi$ would be quite high, thus allowing the device to be used at much higher frequencies than its design frequency and the base rate frequency may be extracted from the OTDM data of even extremely high data rates. If the modulator is driven at a voltage greater than $V_\pi$, then its effective modulation frequency is at a multiple of the driving frequency. The modulator can thus be used to modulate an incoming bit stream at a harmonic of the local oscillator (VCO) frequency with or without the use of frequency multipliers.

Figure 8:
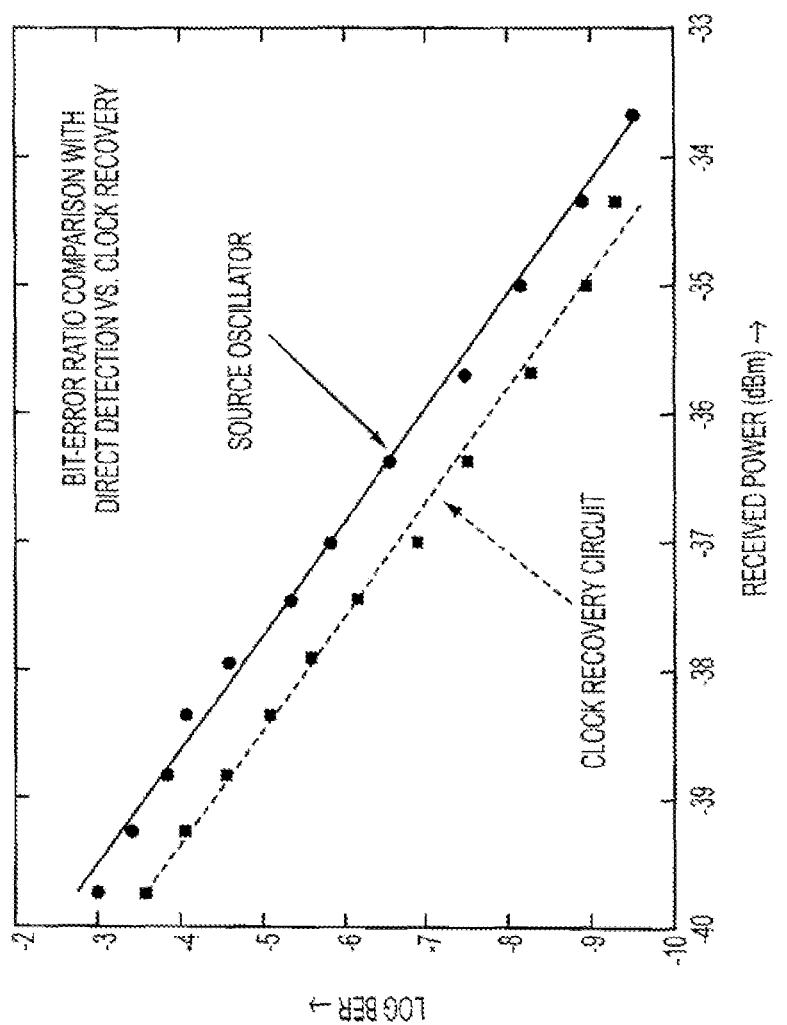
FIG. 8 shows a comparison of bit-error ratio vs. received power per channel using the clock recovery circuit to drive the demultiplexer vs. using the source oscillator.

FIG. 8 shows a comparison of bit-error ratio vs. received power per channel using the clock recovery circuit to drive the demultiplexer vs. using the source oscillator.

In yet another embodiment a Sagnac modulator is employed rather than the Mach-Zhender modulator. Similar to the embodiment shown in FIG. 7, the Sagnac modulator is driven by the VCO in a phase locked loop and may be employed to modulate the input data stream.

Although this invention has been described in relation to the exemplary embodiment's thereof, it is well understood by those skilled in the art that other variations and modifications can be affected on the preferred embodiment without departing from scope and spirit of the invention as set fourth in the claims.

The invention claimed is:

1. An electro-optic clock recovery circuit comprising:
   an electro-optic modulator circuit comprising a Mach-Zehnder modulator;
   a balanced photodetector circuit operatively coupled to said modulator circuit, and comprising at least one slow photodetector series coupled to a second photodetector;
   a buffer circuit;
   a voltage controlled oscillator operatively coupled to said photodetector circuit through said buffer circuit; and
   at least one frequency multiplier operatively coupled to said voltage controlled oscillator and said electro-optic modulator circuit,
   wherein said electro-optic modulator circuit is operatively coupled to said voltage controlled oscillator circuit in a phased lock loop, receives an optical time division multiplexed data stream and samples the entire optical data stream,
   wherein said voltage controlled oscillator comprises a voltage controlled oscillator frequency and wherein the at least one frequency multiplier comprises a harmonic of said voltage controlled oscillator frequency.

2. The apparatus of claim 1 wherein said balanced photodetector circuit comprises at least one slow photodetector series coupled to a second photodetector.

3. An electro-optic clock recovery circuit comprising:
   an electro-optic modulator circuit comprising a Sagnac modulator operatively coupled to;
   a balanced photodetector circuit, wherein said balanced photodetector circuit comprises at least one slow photodetector series coupled to a second photodetector;
   a buffer circuit operatively coupled to said balanced photodetector circuit;
   a voltage controlled oscillator operatively coupled to said buffer circuit and to said electro-optic modulator circuit;
   at least one frequency multiplier operatively coupled to said voltage controlled oscillator and said electro-optic modulator circuit, wherein said voltage controlled oscillator comprises a voltage controlled oscillator frequency and wherein the at least one frequency multiplier comprises a harmonic of said voltage controlled oscillator frequency
   wherein said electro-optic modulator circuit receives and modulates a data stream, said photodetector circuit responsive to said modulated input data stream drives said voltage controlled oscillator in a phase locked loop through said buffer circuit, and said modulator circuit is responsive to said voltage controlled oscillator and is driven at a harmonic of said voltage controlled oscillator.

4. The apparatus of claim 3 wherein said balanced photodetector circuit comprises at least one slow photodetector series coupled to a second photodetector.

5. The apparatus of claim 3 wherein said electro-optic modulator circuit samples all channels of a multi-channel data stream.

6. The apparatus of claim 3 wherein said electro-optic modulator is biased at minimum transmission.

7. The apparatus of claim 3 wherein said buffer circuit comprises an amplifier.

* * * * *